US008321999B2

(12) United States Patent
Boden

(10) Patent No.: US 8,321,999 B2
(45) Date of Patent: Dec. 4, 2012

(54) SELF-LOCKING CORD LOCK WITH HOUSING AND SLIDE PIECE

(76) Inventor: Robert O. Boden, Altadena, CA (US)

( * ) Notice: Subject to any disclaimer, the term of this patent is extended or adjusted under 35 U.S.C. 154(b) by 288 days.

(21) Appl. No.: 12/831,146

(22) Filed: Jul. 6, 2010

(65) Prior Publication Data

US 2012/0005865 A1    Jan. 12, 2012

(51) Int. Cl.
*A43C 7/08* (2006.01)
(52) U.S. Cl. .................... 24/136 R; 24/712.5
(58) Field of Classification Search ............. 24/712.5, 24/136 R, 115 M; 36/50.1; 403/211, 374.1, 403/374.2
See application file for complete search history.

(56) References Cited

U.S. PATENT DOCUMENTS

| | | | |
|---|---|---|---|
| 4,156,574 A | 5/1979 | Boden |
| 4,190,935 A | 3/1980 | Matsuda |
| 4,665,590 A | 5/1987 | Udelhofen et al. |
| 4,807,333 A | 2/1989 | Boden |
| 5,263,202 A | 11/1993 | Siberell |
| 5,440,788 A | 8/1995 | Boden |
| 5,572,770 A | 11/1996 | Boden |
| 5,781,273 A | 7/1998 | Boden |
| 5,802,617 A | 9/1998 | Boden |
| 5,894,639 A | 4/1999 | Boden et al. |
| 5,987,712 A | 11/1999 | Tucker |
| 6,038,746 A | 3/2000 | Anscher et al. |
| 6,189,186 B1 | 2/2001 | Boden |
| 6,305,053 B1 | 10/2001 | Galbreath |
| 6,457,214 B1 | 10/2002 | Boden |
| 6,477,748 B2 | 11/2002 | Steiner |
| 6,658,704 B2 | 12/2003 | Buscart |
| 6,889,407 B2 | 5/2005 | Martin |
| 7,254,871 B2 | 8/2007 | Yoshiguchi |
| 7,261,138 B2 | 8/2007 | Judkins et al. |

*Primary Examiner* — James Brittain
(74) *Attorney, Agent, or Firm* — Christie, Parker & Hale, LLP

(57) ABSTRACT

Self-locking devices for locking cords against longitudinal movement and maintaining the cords in a locked position even with no tension on the cords. A cord locking device includes a body and a slide piece for locking two cord segments. The body includes a housing, and the slide piece slides within the housing. The slide piece includes two ears, each having a cord channel through which one of the cord segments may pass, and two arms extending toward the housing, with a substantially upwardly extending tab at the free end of each arm. The cord segments pass through the housing and between the inside surface of the housing and a toothed wedge at a lower end of the slide piece. The toothed wedge grips the cord segments and locks them in place when they are pulled downwardly in the direction that the wedge is tapered.

18 Claims, 11 Drawing Sheets

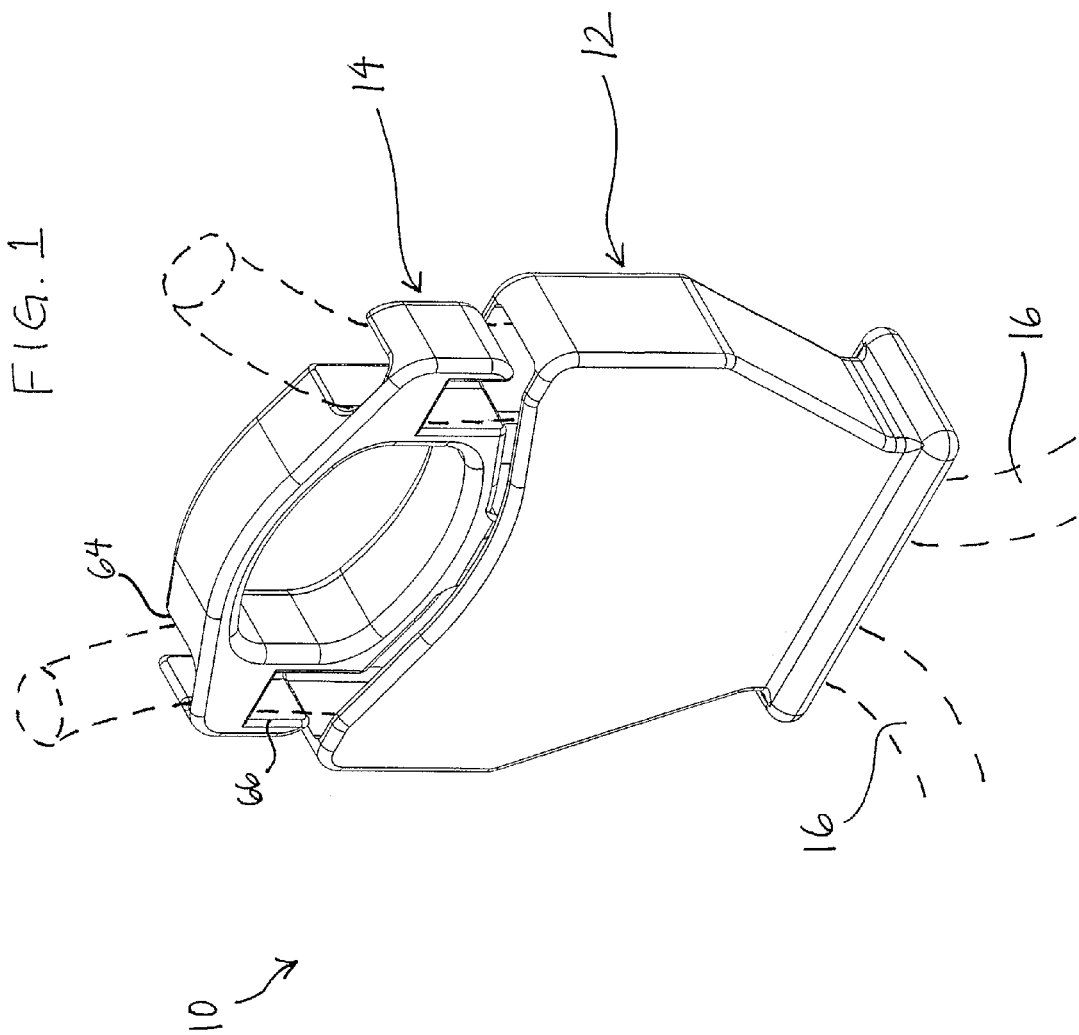

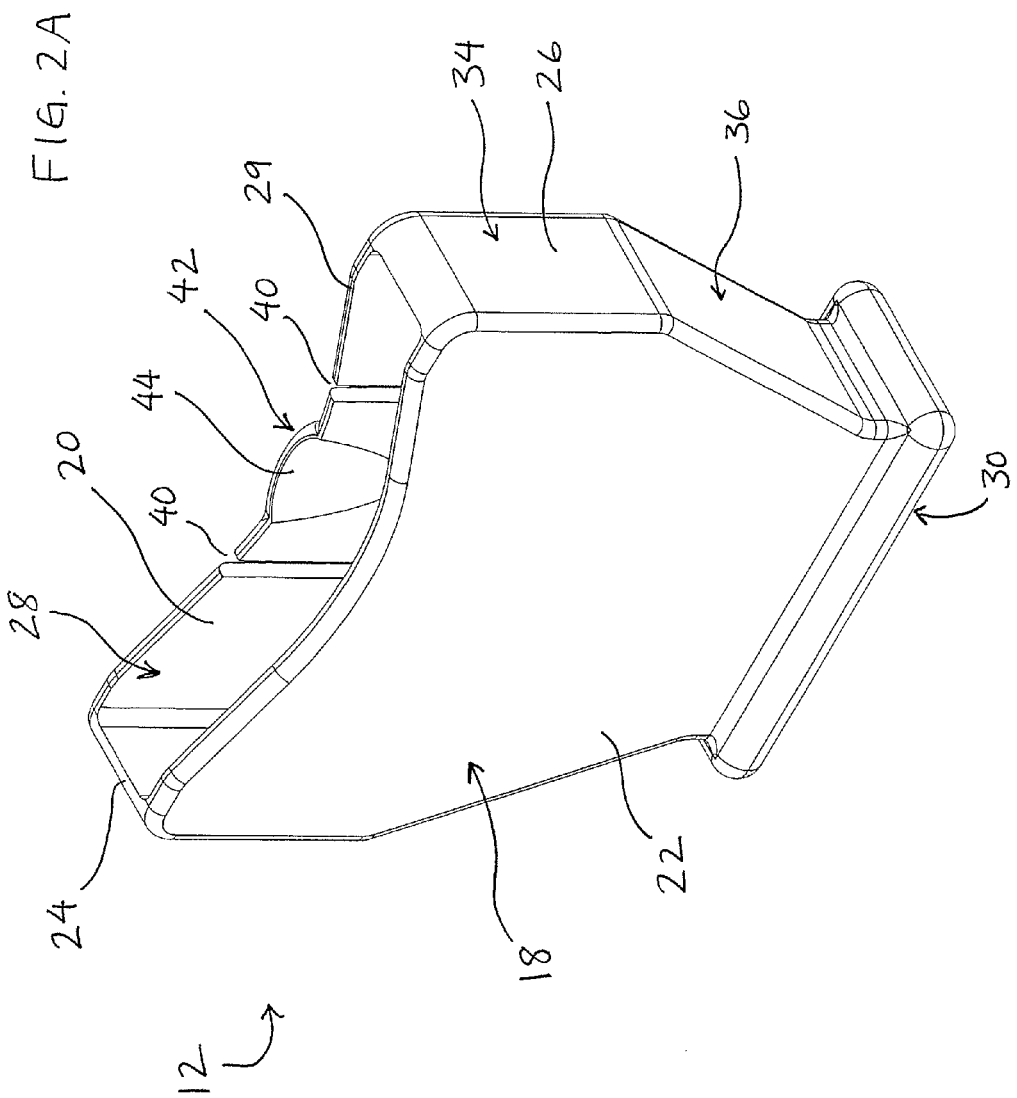

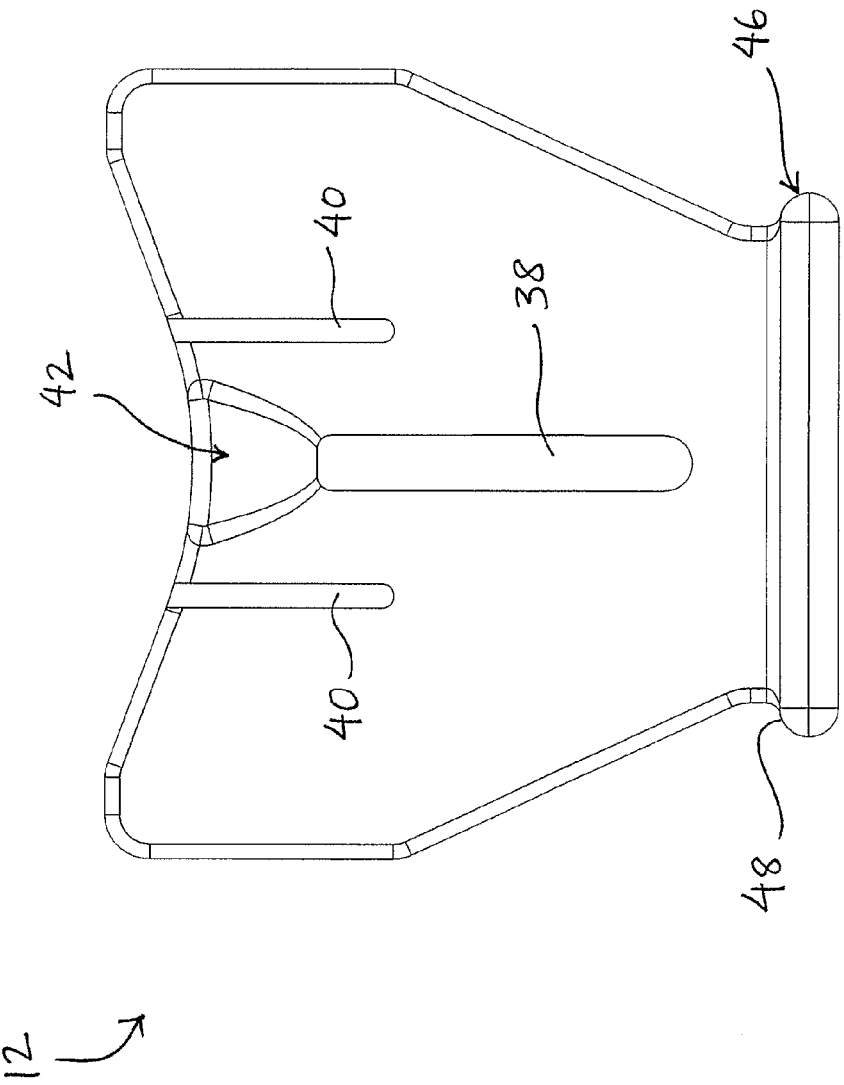

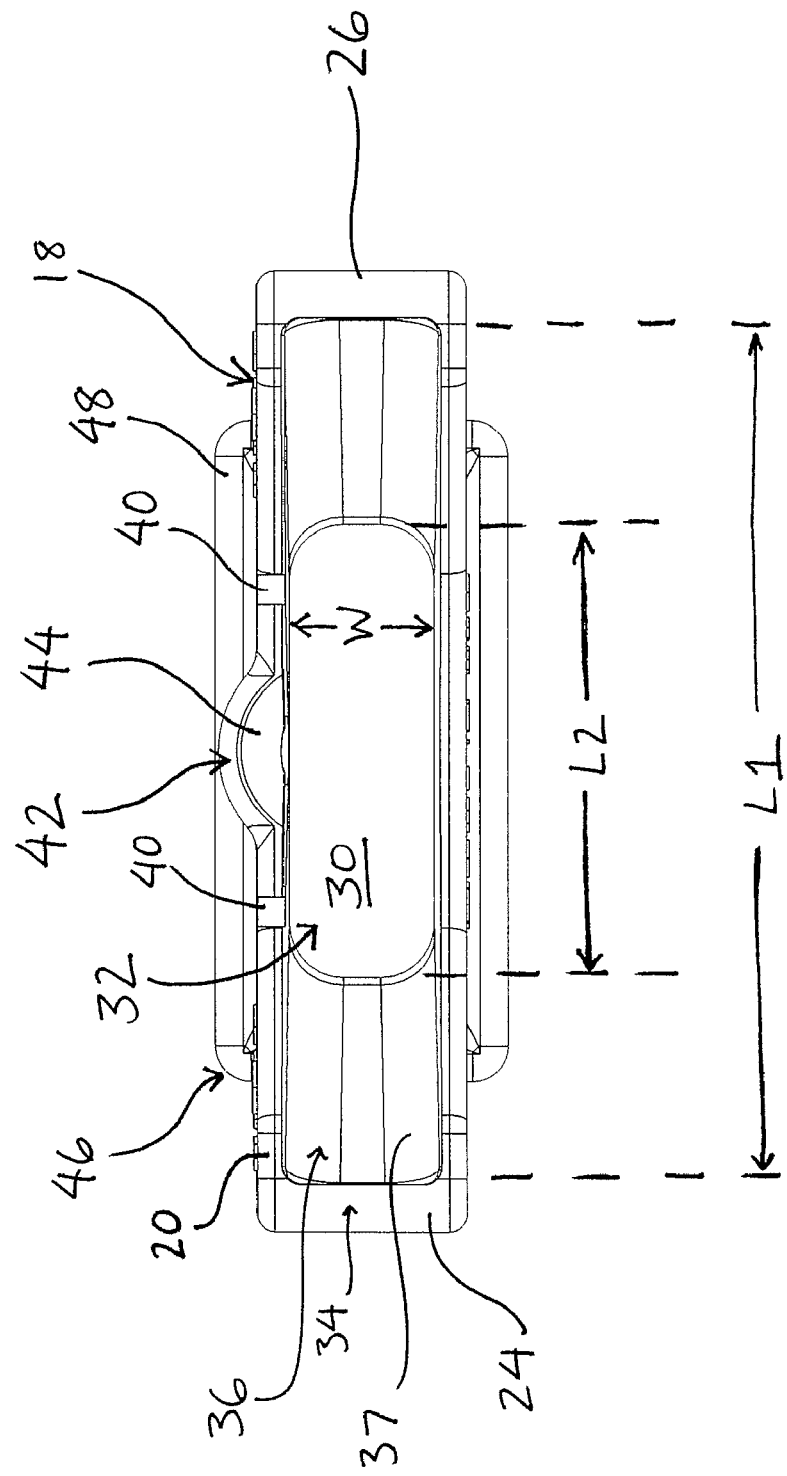

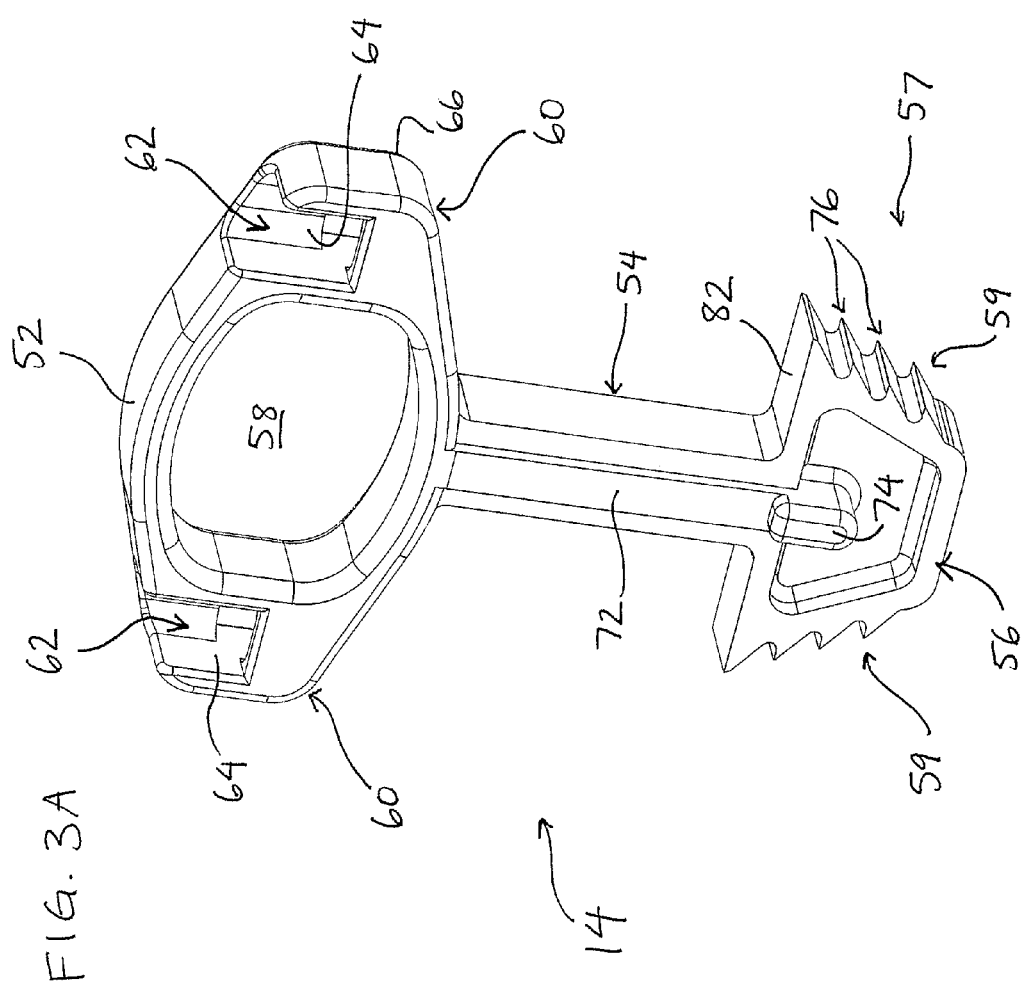

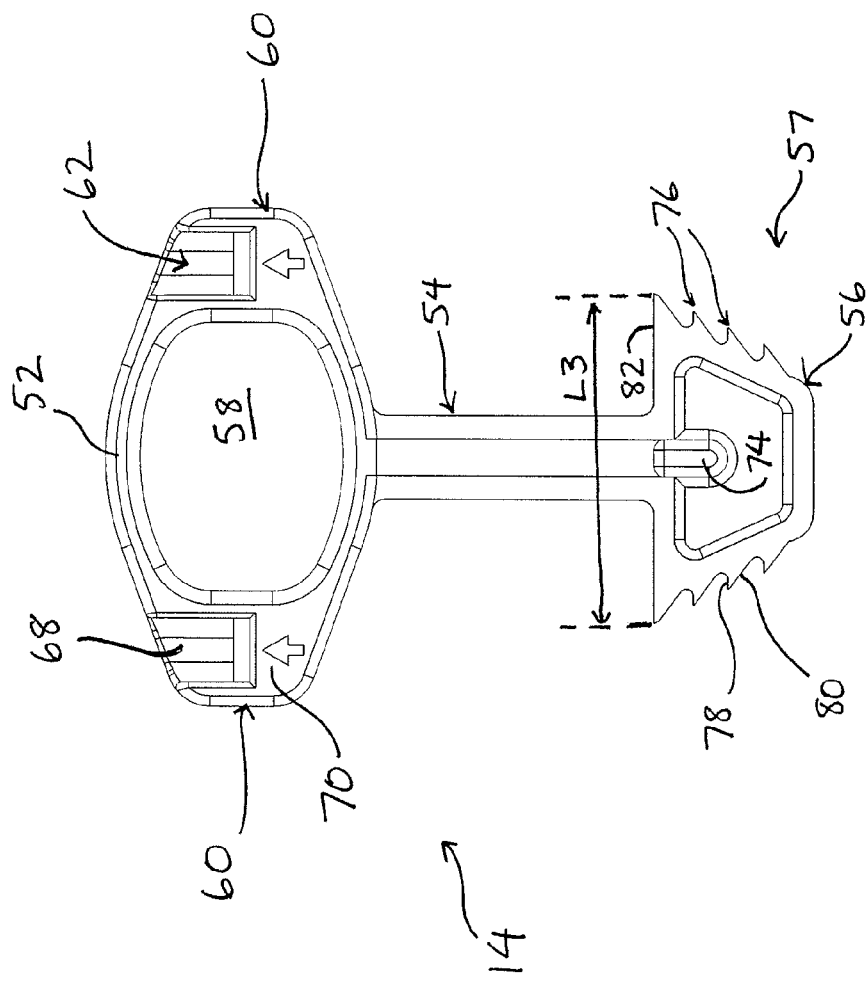

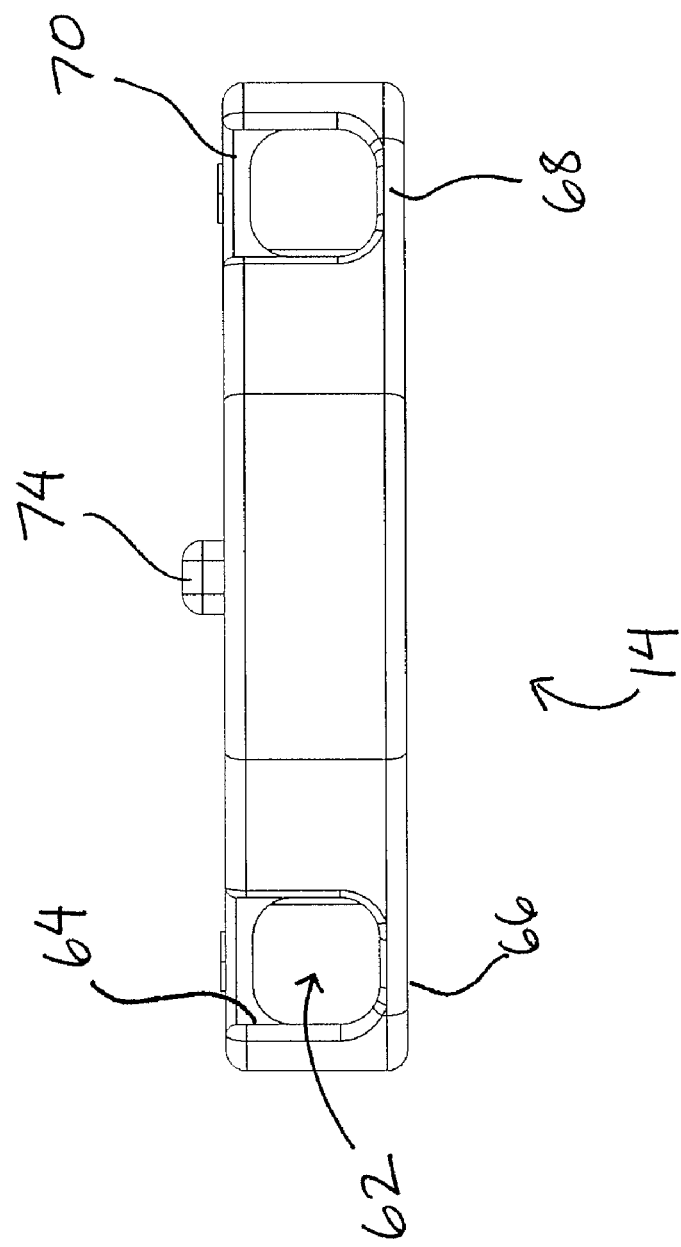

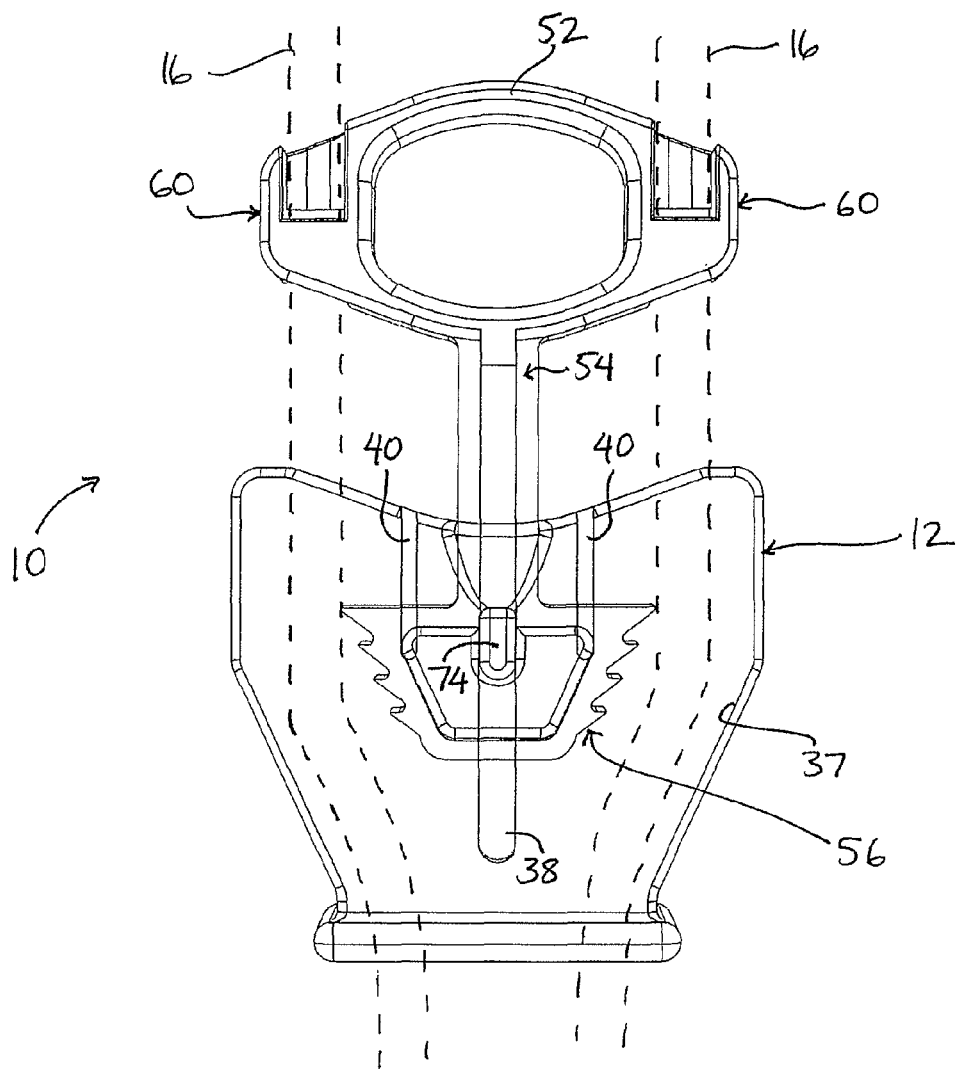

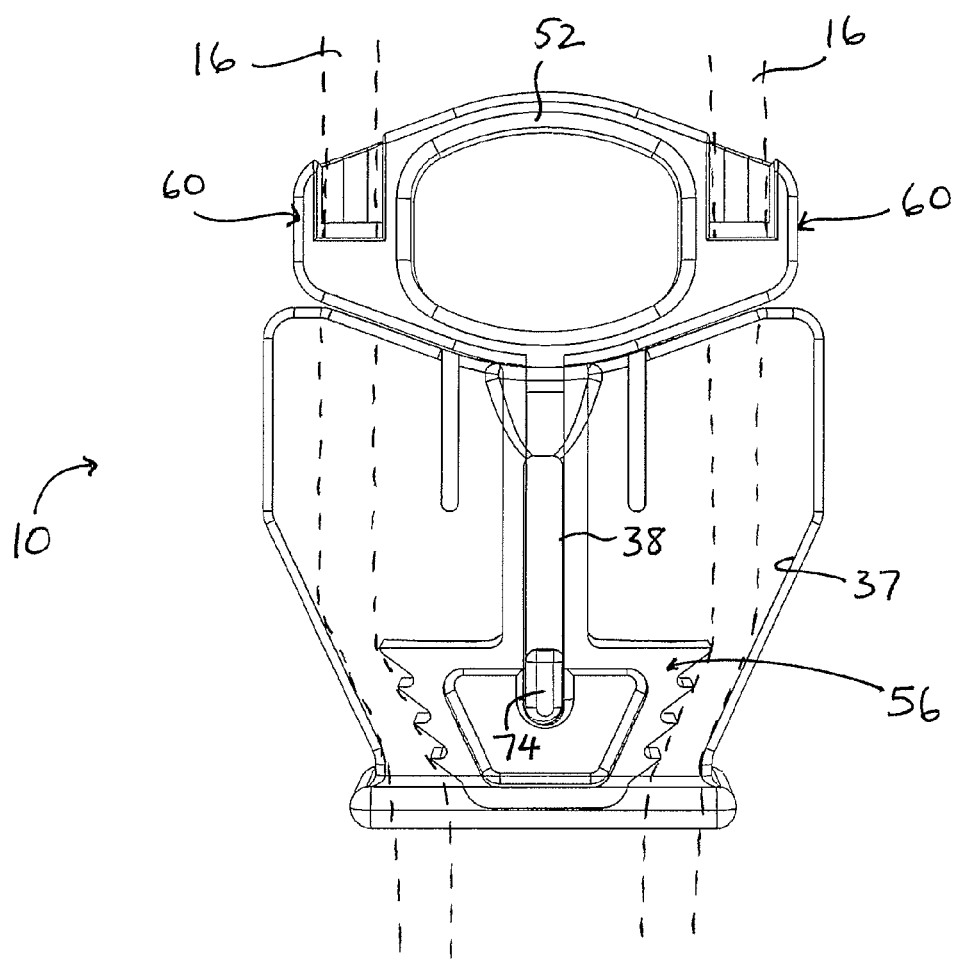

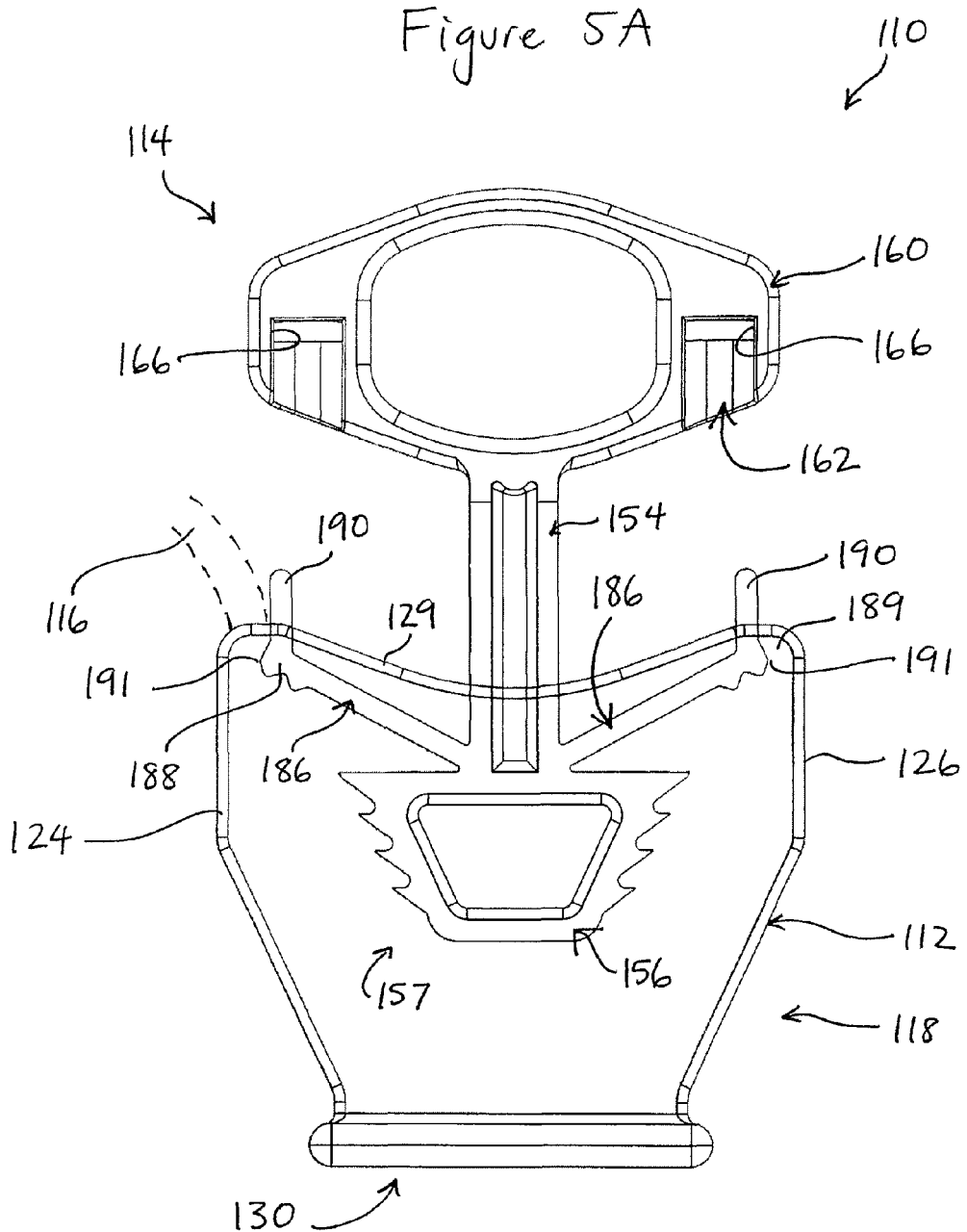

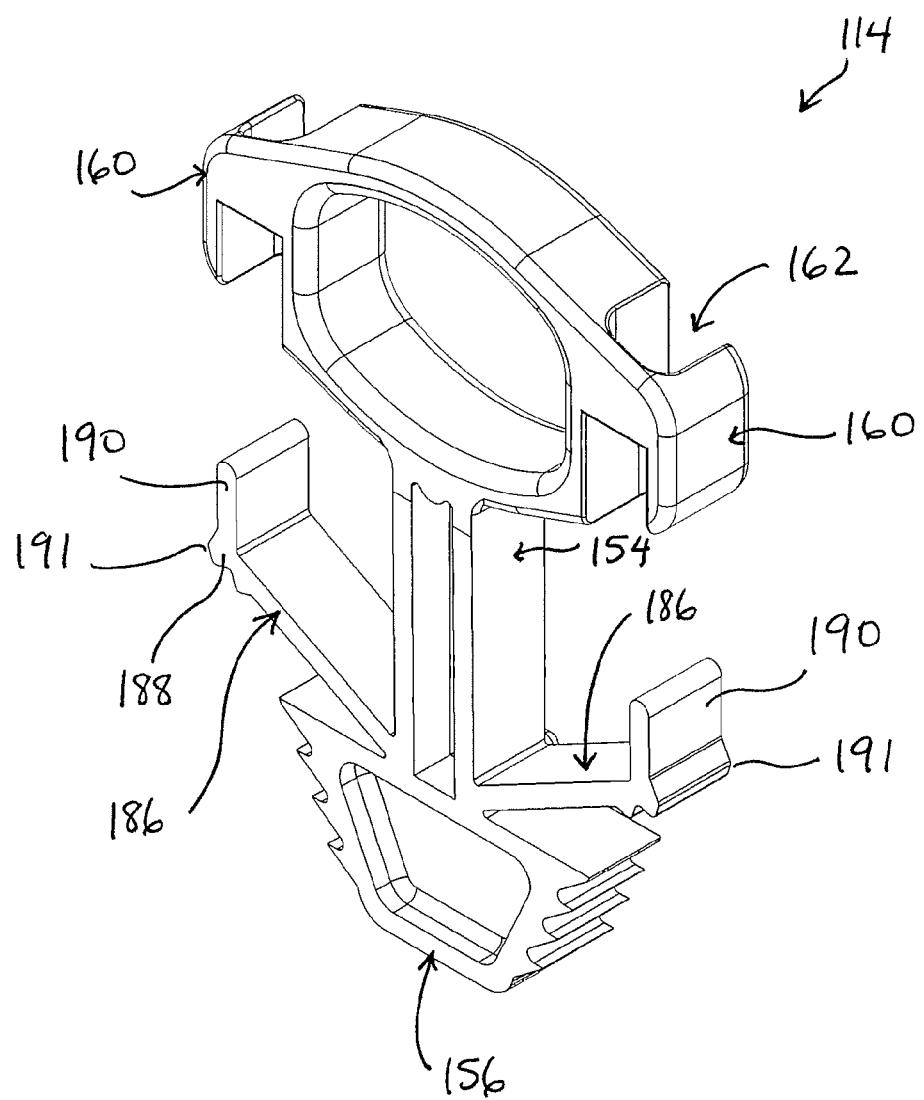

SELF-LOCKING CORD LOCK WITH HOUSING AND SLIDE PIECE

FIELD OF THE INVENTION

The present invention relates to self-locking devices for locking cords against longitudinal movement.

BACKGROUND OF THE INVENTION

Cord locks are used in many applications to retain one or more cord segments in a tightened or locked condition and to release such cord segments when desired. For example, cord locks are used in connection with drawstrings on garments, such as hooded jackets, and storage bags, such as laundry bags.

A number of different cord lock designs have been proposed by those skilled in the art. One such example is the cord lock disclosed in U.S. Pat. No. 4,156,574, which includes a slide part that slides inside of a body part. Two cord segments pass through the body with the slide part between them. The slide part includes a locking section with toothed faces that grip the cords when they are pulled in one direction. The slide can be pulled in the opposite direction to release the cords. The slide also includes two feeler arms that bias the cords against the inside surface of the body to assist with the self-locking feature. However, these feeler arms make it difficult to thread the cords through the cord lock when the slide part and body part are pre-assembled, and thus the cord lock is shipped to customers in an un-assembled condition for the cords to be threaded through the lock before the slide part and body part are assembled. Another cord lock is disclosed in U.S. Pat. No. 5,894,639. This cord lock uses a spring to bias the slide piece into the locked position.

Accordingly, it would be desirable to provide a self-locking cord lock that provides a self-locking action and maintains the cords in a locked position even with no tension on the cords, and that can be threaded with a cord after the lock is assembled.

SUMMARY OF THE INVENTION

The present invention relates to self-locking devices for locking cords against longitudinal movement. In one embodiment, a cord locking device includes a body and a slide piece for locking two cord segments. The body includes a housing, and the slide piece slides within the housing. The slide piece includes two ears, each having a cord channel through which one of the cord segments may pass. The cord segments pass through the housing and between the inside surface of the housing and a toothed wedge at a lower end of the slide piece. The toothed wedge grips the cord segments and locks them in place when they are pulled downwardly in the direction that the wedge is tapered. Additional downward tension applied to the cords causes the wedge to grip the cords even more tightly, further locking them in place.

In one embodiment, there is provided a cord locking device for locking a first cord segment against longitudinal movement with respect to a second cord segment. The locking device includes a housing comprising a passage, and a slide piece received at least partially within the passage. The slide piece comprises a handle and a locking portion, and the slide piece and the housing comprise mating features that constrain sliding movement of the slide piece within the passage. The slide piece further includes first and second arms extending from the slide piece toward the housing. Each arm has a free end, and each arm is positioned to leave a space between the housing and the free end of the arm for passage of one of the cord segments. Each arm has a substantially upwardly extending tab at the free end of the arm.

In one embodiment, a cord locking device for locking two cord segments includes a housing comprising a front wall and an opposing rear wall, and a first side wall and an opposing second side wall, the walls defining a passage through the housing; and a slide received in the housing, the slide comprising a handle, a wedge, and a neck connecting the handle to the wedge. The slide includes a projection that fits through a slot on the front wall of the housing, to constrain the sliding movement of the slide in the housing. The wedge comprises opposing toothed surfaces, and the side walls comprise converging tapered portions. The handle has first and second ears on opposite sides of the handle, each ear comprising a channel for receipt of such cord segment. The slide further includes first and second arms, each arm extending toward the first or second side wall, respectively, and each arm having a substantially upwardly extending tab at a free end of the arm.

BRIEF DESCRIPTION OF THE DRAWINGS

FIG. 1 is a perspective view of a cord locking device according to an embodiment of the invention.

FIG. 2A is a perspective view of a body section of the cord locking device of FIG. 1.

FIG. 2B is a front view of the body section of FIG. 2A.

FIG. 2C is a top view of the body section of FIG. 2A.

FIG. 3A is a front perspective view of a slide piece according to an embodiment of the invention.

FIG. 3B is a front view of the slide piece of FIG. 3A.

FIG. 3C is a top view of the slide piece of FIG. 3A.

FIG. 4A is a front view of a cord locking device according to an embodiment of the invention, in a released position.

FIG. 4B is a front view of the cord locking device of FIG. 4A, in a locked position.

FIG. 5A is a rear view of a cord locking device according to an embodiment of the invention.

FIG. 5B is a perspective view of the slide piece of the cord locking device of FIG. 5A.

DETAILED DESCRIPTION OF THE INVENTION

The present invention relates to self-locking devices for locking cords against longitudinal movement. In one embodiment, a cord locking device includes a body and a slide piece for locking two cord segments. The body includes a housing with a passage, and the slide piece fits at least partially inside the housing and slides within it. The slide piece includes two ears, each having a cord channel through which one of the cord segments passes. The cord segments then pass through the housing and between the inside surface of the housing and a toothed wedge at a lower end of the slide piece. The toothed wedge grips the cord segments and locks them in place when they are pulled downwardly in the direction that the wedge is tapered. Additional downward tension applied to the cords causes the wedge to grip the cords even more tightly, further locking them in place. The slide piece may also include a longitudinal rib for reducing friction between the slide piece and the housing. The housing may further include two spaced notches for increasing the flexibility of the front wall of the housing, and a circumferential rib for strengthening the lower end of the housing.

In one embodiment, shown in FIG. 1, a cord locking device 10 includes a body 12 and a slide piece or "slide" 14. The body 12 and slide piece 14 fit together to lock and release two cord segments 16. The two cord segments 16 may be opposite ends of a single cord. Where reference is made to two cord segments in this specification, it should be understood to cover two cords or two portions of a single cord. Also, relative terms such as "upward" and "downward" are used for clarity to refer to the orientation of features in the figures, but are not intended to be limiting. The references to "upward" and "downward" directions are used in describing the structure and function of the cord locking device, specifically in relation to the device in the position of FIG. 1. It will be appreciated that these references are arbitrary in the sense that the cord locking device may be used in any orientation. In all cases, the "downward" direction is the direction of taper of the wedge of the slide piece 14, and the "upward" direction is opposite to the downward direction.

The body 12 is shown in more detail in FIGS. 2A-2C. The body 12 includes a housing 18 having a front wall 20 and an opposing rear wall 22, and opposing side walls 24, 26. The housing 18 has an open top end 28 and an open bottom end 30, and the walls 20, 22, 24, 26 define a passage 32 between the two openings. The front wall 20 and rear wall 22 are substantially parallel, such that the passage 32 has substantially the same width W between these walls. The side walls 24, 26 each include a longitudinal portion 34 extending down from the top opening 28 and a tapered portion 36 extending down from the longitudinal portion toward the bottom opening 30. The passage 32 has a first lateral dimension L1 between the parallel longitudinal portions 34 of the side walls 24, 26, and then the dimension of the passage narrows as the two side walls 24, 26 converge toward each other in the tapered portions 36. At the bottom opening 30, the passage has a second, smaller lateral dimension L2.

The body 12 also includes a central vertical slot 38 in the front wall 20. The slot 38 engages the slide piece 14 as described further below. Straddling the central slot 38 are two vertical notches 40. These notches 40 increase the flexibility of the front wall 20, enabling the portion of the front wall between these two notches to deflect outwardly, which is helpful during assembly, as described more fully below. The notches 40 also allow the front wall 20 to deflect during disassembly, to remove the slide 14 from the housing 18, which may be done to replace a part or thread in a new cord. The notches 40 also allow the front wall 20 to resiliently expand and contract as it is heated and cooled during fabrication and use, without warping the front wall 20. When the front wall becomes warped, as has been seen in some prior art devices, it can undesirably restrain movement of the slide piece 14 and prevent it from sliding freely into and out of the locked position. While two notches 40 are shown, in other embodiments only one notch is provided. The front wall 20 also includes a bulge 42 that curves outwardly from the front wall 20 and has a tapered, conical shape. This bulge 42 forms a ramp 44 on the inside surface of the front wall to assist in insertion of the slide piece 14, as described further below.

The body 12 includes a base 46 at the bottom of the tapered portions 36 of the side walls 24, 26. The base has a reinforcing lip 48 extending circumferentially around the bottom opening 30. At the base, the tapered portions 36 of the side walls extend inwardly to meet the bottom opening 30 at a shorter length L2 than the length L1 of the opening at the top of the passage 32. The length L2 of the bottom opening 30 is shorter than a length of the wedge of the slide piece, as described further below. As a result, the wedge cannot be pulled through the housing 18 and out the bottom opening 30.

The body may have a curved upper edge 29 that curves downwardly in an arc between the two side walls 24, 26, along the front and rear walls 20, 22. This curved shape mates with the curved handle 52, as shown in FIG. 4B. However, in other embodiments the upper edge 29 and the handle 52 may have other shapes, and they do not necessarily mate. Additionally, while the housing 18 is shown with a substantially rectangular horizontal cross-section in FIG. 2C, it can have other shapes such as elliptical.

The slide piece 14 is shown in more detail in FIGS. 3A-3C. The slide piece 14 includes a handle 52 and a locking portion 57 connected by an elongated neck 54. The handle 52 includes an opening 58 for a user to insert a finger, or a lanyard (such as where the device is controlled remotely), in order to pull up on the slide piece 14. The handle 52 also includes two ears 60 on opposite sides of the opening 58.

Each ear 60 includes a cord channel 62 extending vertically through the ear. The cord channel 62 is defined by a cutout 64 through the front surface of the handle 52 at the top of the ear, and a cutout 66 through the back surface of the handle, at the bottom of the ear. The cutouts 64, 66 are staggered, each opening to an opposite side of the slide piece 14. The cutout 64 exposes a back wall 68, and the cutout 66 exposes a front wall 70 such that the two cutouts are connected to form a vertical passage through the handle. The cord 16 passes through the cord channel 62 by passing into the cutout 64 in front of the back wall 68 and then into the cutout 66, passing behind the front wall 70 (as viewed from the front view of FIG. 3B). The cord frictionally engages the back wall 68 and the front wall 70 as it passes through the channel 62. In other embodiments, the cord channels can take other shapes, such as a cylindrical bore from the top of the ear to the bottom, without any cutouts in the front or back surfaces.

In one embodiment, the cord segments 16 have a cross-sectional area that is about the same as or slightly larger than the cross-sectional area of the channels 62, such that the outer surface of the cord segment frictionally engages the back wall 68 and front wall 70 as the cord passes through the channel 62, to assist in the self-locking action of the cord locking device, as described further below.

The neck portion 54 of the slide piece 14 includes a rib 72 extending longitudinally along the neck. This rib contacts the inside surface of the front wall 20 of the housing, and distances the neck 54 away from the wall 20 to reduce the friction between the neck and the front wall as the two pieces slide relative to each other.

The slide piece 14 and the housing 18 have mating features that allow the slide piece 14 to move up and down within the housing but with a constrained range of movement. In the illustrated embodiment, the mating features include a projection such as a lug 74 on the slide piece 14 and the slot 38 of the housing. The lug 74 extends outwardly past the rib 72 at the bottom end of the rib. The lug 74 extends through the central slot 38 in the front wall 20 of the housing, and slides within the slot 38. The length of the lug 74 is less than the length of the slot 38, such that the slide piece 14 can slide longitudinally up and down within the housing 12, with the lug moving up and down within the slot 38. Movement of the slide piece 14 up out of the housing 12 is constrained by contact of the lug 74 against the upper end of the slot 38, preventing the lug and the slide piece 14 from moving further upward. The slot 38 is substantially longitudinal, with parallel side edges, so that it guides the lug 74 and thus the slide piece 14 up and down in a substantially longitudinal path. In other embodiments, other mating features can be used, such as a recessed channel on the inside surface of the front or rear wall of the housing, which receives a lug or projection on the slide piece. Alternatively, the two mating features may include an inward projection on the housing 18 that engages a slot formed within the slide piece 14.

At the bottom end of the neck 54 is the locking portion 57, which includes a wedge piece 56 with opposing toothed surfaces 59. The opposing surfaces 59 are tapered such that the wedge becomes more narrow moving longitudinally away from the neck 54 (the "downward" direction of FIGS. 1-4). The tapered side surfaces 59 of the wedge converge at approximately the same angle as the tapered portions 36 of the side walls 24, 26. This angle can vary between approximately 30° and 60°. In the embodiment shown, the angle is approximately 45°. The side surfaces 59 of the wedge include teeth 76 comprising edges 78 and ramps 80, as shown in FIG. 3B. The pointed edges of the teeth may lie in a single plane, parallel to the inside surfaces 37 of the tapered portions 36. These teeth are oriented to allow passage of the cord 16 upward, in the direction that the wedge widens, but to limit movement of the cord downward, in the direction that the wedge tapers. As the cord 16 moves upward, it passes over the ramps 80 and tends to lift the slide piece 14. However, when it moves downward, it is blocked by the edges 78 and applies a downward force on the slide piece that more tightly locks the cord in position.

The assembly and operation of the device will be described with reference to FIGS. 4A-4B. In FIGS. 4A-4B, the slide is shown as visible through the housing for purposes of explanation. To assemble the device, the wedge 56 of the slide is inserted into the top opening 28 of the housing 12. The slide is pushed down until the lug 74 reaches the bulge 42. As the slide is pushed further down, the lug 74 moves along the ramp 44 on the inside surface of the bulge, causing the portion of the front wall 20 between the notches 40 to deflect outward, to accommodate passage of the lug 74. These notches 40 assist with assembly, making the front wall more flexible to accommodate the lug 74. With the bulge 42 and ramp 44, the lug 74 itself need not be tapered or have a ramp portion in order to slide into the housing and pass under the front wall 20. The lug then snaps into the slot 38, and the front wall returns resiliently to its natural, unbiased position. The slide piece 14 can then slide up and down within the housing, constrained by engagement of the lug 74 within the slot 38. The cord segments 16 pass through the cord channels 62 in each ear 60, through the top opening 28 of the housing 12, into the passage 32, between the wedge 56 and the inside surfaces 37 of the tapered portions 36 of the side walls, and then out the bottom opening 30. Optionally, the surfaces 37 may have a semicircular cross-section in order to complement the shape of the cords.

The cord segments 16 may be threaded through the cord locking device 10 after the slide piece 14 has been assembled into the body 12 as just described. The end of each cord segment 16 may be simply passed through the cord channel 62 in the respective ear 60 and then fed through the body 12 between the wedge 56 and the respective inside surface 37. The slide piece 14 may be raised into the released position (see FIG. 4A) to allow the cord segments 16 to be fed through the body 12. Thus, the cord segments 16 may be fed through the lock 10 after the slide piece 14 and body 12 are assembled together.

FIG. 4A shows the device in a released or unlocked position, and FIG. 4B shows the device in a tightened or locked position. In FIG. 4A, the slide piece 14 is in an extended or released position, with the lug 74 near the top of the slot 38 in the front wall 20. Further upward movement of the slide piece 14 will bring the lug 74 into contact against the top of the slot 38, constraining further upward movement of the slide piece 14. In the extended position, the wedge 56 is spaced away from the inside surfaces 37 of the tapered portions 36 of the side walls 24, 26, providing a clearance between the teeth 76 and the inside surfaces 37. The cord segments 16 can then pass freely through this clearance, without the teeth 76 biting into and clamping the cords 16. The cords 16 can be adjusted to the desired position to tighten or loosen an object encircled by the cords, such as to tighten or loosen a drawstring on a laundry bag or other flexible container. The user pulls the handle 52 upwardly to extend the slide piece into this position to release the cords 16.

When the user releases the handle 52, tension on the cords 16 causes them to begin to move downward, toward the bottom opening 30. This movement creates a frictional force between the cords 16 and the back wall 68 and front wall 70 of the cord channels 62 in the ears 60. This frictional force tends to draw the slide piece 14 downward along with the cords 16. Friction between the cords 16 and the wedge 56 also acts to move the slide piece 14 down. As the slide piece 14 moves down, the clearance between the wedge 56 and the inside surfaces 37 decreases, due to the wedge 56 moving down toward the converging end of the tapered sections 36. The cords 16 thus become trapped between the wedge 56 and the tapered inside surfaces 37.

Any further downward movement of the cords 16 causes the teeth 76 to further bite into and clamp the cords 16, increasing the force on the cords and preventing them from sliding over the edges 78 of the teeth. This results in the cords being clamped between the slide piece 14 and the housing 12, effectively locking the cords in place. This "locked" position is shown in FIG. 4B. In one embodiment, the wedge 56 of the slide piece 14 is substantially rigid, enabling it to withstand high loads from the cords. The teeth 76 do not deflect, and the toothed faces of the wedge do not move inward toward each other when the wedge 56 grips the cords in the locked position.

In the locked position, additional force or tension on the cords 16 causes the wedge 56 to clamp tighter against the tapered inside surfaces 37, clamping the cords 16 even more tightly. To release the cords 16, the user pulls up on the handle 52, causing the wedge 56 to move up away from the inside surfaces 37, thereby increasing the clearance for the cords 16. The cord segments 16 can then move freely between the surfaces 37 and the wedge 56.

As the slide piece 14 moves up and down inside the housing, the rib 72 spaces the neck 54 away from the inside surface of the front wall 20, thereby reducing the friction between the neck and the front wall. The bulge 42 also reduces friction between the slide piece 14 and the housing 12. This reduction in friction enables the slide piece 14 to move more easily into the released position when the user pulls on the handle 52, and to move more quickly into the locked position when the user releases the handle.

Due to the friction between the cords 16 and the slide piece 14, the cord locking device 10 moves automatically into the locked position when the user releases the handle 52. This self-locking action is useful because the user need only release the handle 52 to lock the device. When the user releases the handle 52 to lock the device, it is desirable for the slide piece 14 to move quickly into the locked position. As described above, the cord channels 62 in the ears 60 contribute to this self-locking action by increasing friction between the cords 16 and the slide piece 14 along the walls 68 and 70, thereby drawing the slide piece 14 down with the cords 16. The cord channels 62 also direct the cords 16 to the outside of the slide piece and toward the toothed surfaces of the wedge 56, further increasing friction between the cords and the slide piece. As a result, the wedge 56 also moves down sooner, so that it can engage the cords 16 and lock them into position.

Moreover, in the embodiments of FIGS. 1-4B, this self-locking action is accomplished without any structure that flexes, such as a spring or biased arms. The ears 60 with cord channels 62 are robust and need not be flexible. As a result, wear against the cord is reduced, and fatigue of the slide piece from repeated flexing is avoided.

Additionally, the increased friction provided by the cord channels 62 helps to prevent the cords 16 from coming unlocked when the load or tension on the cords 16 is reduced. The cords 16 tend to remain in the locked position even when the tension is reduced, because friction between the cords and the cord channels 62, and between the cords and the wedge 56, tends to keep the cords in place. As a result, the cords tend to stay locked until the user purposely releases them by pulling up on the handle 52.

In one embodiment, the body 12 also includes a feature to prevent the slide piece 14 from passing through the bottom opening of the housing 18. The load on the cords 16 causes the cords to exert a downward force on the slide piece 14, moving the wedge downward into the converging portion between the inside surfaces 37. In the prior art, if the cords were subjected to a very high load, they could draw a portion of the slide piece through the bottom opening of the housing. In one embodiment, the present invention includes a shortened bottom opening 30, as shown in FIG. 2C. The wedge 56 on the slide piece 14 includes a shoulder 82 at the top of the wedge, at its widest portion. The length L2 of the bottom opening is less than a length L3 of the shoulder 82. As a result, the wedge 56 cannot pass completely through the bottom opening 30. Additionally, the lug 74 is constrained by the bottom of the center slot 38. Contact between the lug 74 and the bottom of the slot 38 further inhibits the slide piece 14 from moving down too far through the housing 12.

The body 12 and slide piece 14 are both desirably molded from an inexpensive, commonly available lightweight, resilient plastic material such as polypropylene, nylon, or acetal. These materials have sufficient resiliency to permit the relatively thin front wall 20 to deflect resiliently during assembly, as described above, but otherwise are sufficiently rigid that the parts retain their shape and resist deformation. The body 12 and slide piece 14 can be created through injection molding, as is known in the art.

Regarding the cord 16, in one embodiment, the largest diameter of the cords is equal to or slightly greater than the shortest distance between the opposite sides of the cord channels 62 in the slide piece 14, so as to maintain a nominal frictional engagement therein. This sizing keeps the cord 16 in contact with the channel 62, which further helps in the desired self-locking action. The cords may be textured to enhance the frictional engagement with the channels 62 and with the body 12. In one embodiment, the cords are tipped like shoelaces, but such tipping is optional and the cords may be untipped if they are relatively soft and flexible. The cords may be made from materials such as polyester, polypropylene, or a suitable synthetic material. If the cords are made of synthetic fibers, they may be hot-cut instead of tipped. In one embodiment, round textured polyester braided cords, commonly used in casual shoelaces, are preferred, as they have a desired spongy feel and are less expensive per unit volume than many other cords. In other embodiments, the cords may be solid, hollow, flat, round, synthetic, natural, braided, or other shapes, materials, and configurations. In one embodiment, the cords are round, braided cords with a central unbraided core of fibers. The cords may be resilient, with a spongy or springy feel, to help the teeth of the slide piece engage the cords.

In another embodiment, a cord locking device 110 includes a slide piece or "slide" 114 that has an additional, optional, arm 186 on each side of the neck portion 154, as shown in FIGS. 5A-B. The arm 186 extends at an angle from the intersection of the neck 154 and the locking portion 157, toward the side walls 124, 126 of the housing 118. The cord segments 116 pass through a space 189 between the arms 186 and the side walls 124, 126.

The arms 186 provide additional frictional engagement between the slide piece 114 and the cord segments 116. The arms may be useful in situations where, for example, the cord segments 116 include enlarged tips or ends that cannot be passed through the cord channels 162 in the ears 160. The cord segments 116 may be, for example, synthetic cords with hot-cut ends that are larger than the diameter of the rest of the cord. In such a situation, the cord segments 116 may simply be passed through the body 112, between the arms 186 and the housing 118, and out the bottom opening 130. The cord segments can bypass the cord channels 162. The arms 186 then provide the self-locking action, by frictionally engaging the cord segments 116 such that the slide piece 114 moves downwardly with the cord segments 116. When the cord locking device 110 is assembled with cord segments 116, the cord segments 116 push against the ends 188 of the arms 186, causing the arms to be biased inwardly, bending at the base toward the neck 154. The resilient arms 186 thus press back against the cord segments 116, ensuring frictional engagement, even when there is no tension on the cords.

Notably, the cutout 166 on each ear 160 provides space for the cord segment 116 to exit the body 112 and bypass the cord channels 162, so that the slide piece 114 can be fully seated against the body 112 in the locked position even when the cord segments 116 are not threaded through the cord channels 162.

Optionally, the arms 186 may be provided even when the cord segments 116 are passed through the channels 162. In such a case, the arms 186 provide additional frictional engagement between the slide piece 114 and the cords 116, to enhance the self-locking action and maintain the cords in a locked position even with no tension on the cords. The arms 186 also include a ridge or projection 191 at the end of the arm, facing toward the space 189. This ridge 191 increases the frictional engagement between the arm 186 and the cord 116, to assist in the self-locking action. In one embodiment the ridge has a smooth, curved outer contour to reduce wear on the cord 116.

As shown in FIGS. 5A-B, the arms 186 include an upwardly extending tab 190 at the free, cantilevered end 188 of the arms 186 opposite the wedge 156. The tabs 190 enable a user to push against the arms 186 and deflect them inwardly toward the neck 154, in order to thread a cord segment 116 through the space 189. That is, even when the slide piece 114 and the body 112 are pre-assembled, the arms 186 can be deflected inwardly to allow the cord segments 116 to be threaded through the body 112. The tabs 190 provide a surface for the user to grip to push the arms 186 inwardly. The user can simply squeeze the two arms 186 inwardly toward each other by pushing on the tabs 190. This feature enables the slide piece 114 and body 112 to be pre-assembled before the cord segments 116 are threaded through the device. Additionally, the tabs enable the cord 116 to be replaced with a new cord, without dis-assembling the cord lock 110. The user can simply squeeze the two tabs 190 toward each other to open the space 189 and pull out the old cord and thread in a new cord. The same cord lock 110 can then be used with a new cord.

The tabs 190 extend above the upper edge 129 of the body 112 when the slide 114 is in the unlocked, raised position (as shown in FIG. 5A). The arms 186 and tabs 190 are positioned and dimensioned so that the tabs 190 extend above the housing 118 so that they can be gripped by a user. The tabs 190 extend substantially upwardly from the arms 186, and they may extend vertically or at a non-vertical angle. The tabs 190 make the arms 186 accessible by the user to deflect the arms inwardly to remove or replace a cord.

When the tabs 190 are squeezed together, the arms 186 deflect, curving up from the base where they connect to the neck 154. The tabs 190 themselves are shorter than the arms 186, and the tabs 190 do not necessarily deflect when they are squeezed. The arms 186 deflect, and they may include a radius on the inside where the arms meet the neck 154, to reinforce the base of the arms and reduce stress where the arms flex.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A cord locking device for locking a first cord segment against longitudinal movement with respect to a second cord segment, the cord locking device comprising:
   a housing comprising a passage; and
   a slide piece received at least partially within the passage, wherein the slide piece comprises a handle and a locking portion,
   wherein the slide piece and the housing comprise mating features that constrain sliding movement of the slide piece within the passage,
   wherein the slide piece further comprises first and second arms extending from the slide piece toward the housing, each arm having a free end, wherein each arm is positioned to leave a space between the housing and the free end of the arm for passage of one of the cord segments, and wherein each arm has a substantially upwardly extending tab at the free end of the arm,
   wherein the first and second arms are deflectable toward the slide piece and away from the housing for receipt of such cord segments between the arms and the housing, each of the arms being inwardly deflectable from a first position in which the arm is not pushed by a user to a second position in which the arm is pushed by the user to pass one of the cord segments in the space, and
   wherein the tab at the free end of each arm extends at least partially externally of the housing when the arm is in the first position to be gripped by the user.

2. The cord locking device of claim 1, wherein the locking portion comprises a wedge having opposed toothed surfaces.

3. The cord locking device of claim 1, wherein the mating features comprise a projection on the slide piece that fits into a slot in the housing.

4. The cord locking device of claim 1, wherein the housing comprises a front wall and an opposing rear wall, and a first side wall and an opposing second side wall.

5. The cord locking device of claim 1, wherein the housing comprises a wall, and wherein the wall comprises a first notch to allow the wall to deflect.

6. The cord locking device of claim 1, further comprising the first and second cord segments passing through the space between the housing and the first and second arms, respectively.

7. A cord locking device for locking a first cord segment against longitudinal movement with respect to a second cord segment, the cord locking device comprising:
   a housing comprising a passage; and
   a slide piece received at least partially within the passage, wherein the slide piece comprises a handle and a locking portion,
   wherein the slide piece and the housing comprise mating features that constrain sliding movement of the slide piece within the passage,
   wherein the slide piece further comprises first and second arms extending from the slide piece toward the housing, each arm having a free end, wherein each arm is positioned to leave a space between the housing and the free end of the arm for passage of one of the cord segments, and wherein each arm has a substantially upwardly extending tab at the free end of the arm, and
   wherein the handle comprises first and second channels sized for receipt of such cord segments.

8. The cord locking device of claim 7, wherein the handle comprises first and second ears on opposite sides of the handle, and wherein the first channel passes through the first ear and the second channel passes through the second ear.

9. The cord locking device of claim 7, further comprising the first and second cord segments.

10. The cord locking device of claim 9, wherein the first and second cord segments comprise round, textured cords.

11. The cord locking device of claim 9, wherein the first cord segment passes through the first channel and the second cord segment passes through the second channel.

12. The cord locking device of claim 11, wherein the first and second cord segments are sized to frictionally engage surfaces of the first and second channels, respectively.

13. A cord locking device for locking a first cord segment against longitudinal movement with respect to a second cord segment, the cord locking device comprising:
   a housing comprising a passage; and
   a slide piece received at least partially within the passage wherein the slide piece comprises a handle and a locking portion,
   wherein the slide piece and the housing comprise mating features that constrain sliding movement of the slide piece within the passage,
   wherein the slide piece further comprises first and second arms extending from the slide piece toward the housing, each arm having a free end, wherein each arm is positioned to leave a space between the housing and the free end of the arm for passage of one of the cord segments, and wherein each arm has a substantially upwardly extending tab at the free end of the arm,
   wherein the housing comprises a front wall and an opposing rear wall, and a first side wall and an opposing second side wall, and
   wherein the mating features comprise a slot on the front wall, and wherein the front wall comprises first and second notches on opposite sides of the slot.

14. A cord locking device for locking a first cord segment against longitudinal movement with respect to a second cord segment, the cord locking device comprising:
   a housing comprising a passage; and
   a slide piece received at least partially within the passage, wherein the slide piece comprises a handle and a locking portion,
   wherein the slide piece and the housing comprise mating features that constrain sliding movement of the slide piece within the passage,
   wherein the slide piece further comprises first and second arms extending from the slide piece toward the housing, each arm having a free end, wherein each arm is positioned to leave a space between the housing and the free end of the arm for passage of one of the cord segments, and wherein each arm has a substantially upwardly extending tab at the free end of the arm, and wherein the slide piece comprises a neck connecting the handle to the locking portion, and wherein the neck comprises a longitudinal rib that spaces the neck from an inside surface of the housing.

15. The cord locking device of claim 14, wherein the arms are connected to the neck.

16. A cord locking device for locking two cord segments, comprising:

a housing comprising a passage through the housing; and a slide received into the housing, the slide comprising a handle connected to a wedge, wherein the wedge comprises opposing gripping surfaces, and wherein the handle comprises first and second ears on opposite sides of the handle, each ear comprising a channel for receipt of such cord segment.

17. The cord locking device of claim 16, wherein the slide further comprises first and second arms, each arm extending toward the housing, and each arm comprising a substantially upwardly extending tab at a free end of the arm.

18. The cord locking device of claim 17, further comprising first and second cord segments passing through the channels of the first and second ears, respectively.

* * * * *